(12) United States Patent
Imamura

(10) Patent No.: US 8,290,356 B2
(45) Date of Patent: *Oct. 16, 2012

(54) IMAGING DEVICE WITH IMAGE BLURRING REDUCTION FUNCTION

(75) Inventor: Keiichi Imamura, Humura (JP)

(73) Assignee: Casio Computer Co., Ltd., Tokyo (JP)

( * ) Notice: Subject to any disclaimer, the term of this patent is extended or adjusted under 35 U.S.C. 154(b) by 26 days.

This patent is subject to a terminal disclaimer.

(21) Appl. No.: 12/968,220

(22) Filed: Dec. 14, 2010

(65) Prior Publication Data

US 2011/0085784 A1 Apr. 14, 2011

Related U.S. Application Data

(63) Continuation of application No. 11/701,873, filed on Feb. 2, 2007, now Pat. No. 7,853,134.

(30) Foreign Application Priority Data

Feb. 6, 2006 (JP) .................................. 2006-027968

(51) Int. Cl.
*G03B 17/00* (2006.01)
(52) U.S. Cl. ....................... 396/55; 396/246; 348/208.11
(58) Field of Classification Search .............. 396/52–55, 396/246; 348/208.5, 208.7, 208.12
See application file for complete search history.

(56) References Cited

U.S. PATENT DOCUMENTS

| | | | |
|---|---|---|---|
| 5,296,925 A | 3/1994 | Kondo et al. | |
| 5,307,113 A | 4/1994 | Egawa | |
| 5,596,366 A * | 1/1997 | Takashima et al. | ...... 348/208.16 |
| 6,208,377 B1 | 3/2001 | Morofuji et al. | |
| 6,630,951 B1 | 10/2003 | Suzuki | |
| 6,714,356 B2 | 3/2004 | Tsukamoto | |
| 7,450,832 B2 | 11/2008 | Nomura | |
| 7,483,056 B2 | 1/2009 | Shinohara et al. | |
| 7,692,715 B2 | 4/2010 | Kitajima | |
| 7,853,134 B2 * | 12/2010 | Imamura | ......................... 396/55 |
| 2004/0090532 A1 | 5/2004 | Imada | |

FOREIGN PATENT DOCUMENTS

| | | |
|---|---|---|
| JP | 04-163534 A | 6/1992 |
| JP | 06-165047 A | 6/1994 |
| JP | 6-217188 A | 8/1994 |
| JP | 10-191136 A | 7/1998 |
| JP | 10-336511 A | 12/1998 |

(Continued)

OTHER PUBLICATIONS

Machine translation of detailed description of 2002-214659, Jul. 2002.*

(Continued)

*Primary Examiner* — Christopher Mahoney
(74) *Attorney, Agent, or Firm* — Holtz, Holtz, Goodman & Chick, P.C.

(57) ABSTRACT

In an imaging device including a mechanical image blurring correction and a sensitivity image blurring reduction, a subject-shake amount is calculated based on a motion vector size acquired during a through image process display. Usage percentages of the mechanical image blurring correction and a sensitivity image blurring reduction are sequentially set based on the calculated subject-shake amount. When shooting a still-image, still-image data is recorded after blurring reduction is performed on the still-image data by the mechanical image blurring correction and a sensitivity image blurring reduction, based on the most recently set usage percentages.

23 Claims, 7 Drawing Sheets

FOREIGN PATENT DOCUMENTS

| | | |
|---|---|---|
| JP | 11-326980 A | 11/1999 |
| JP | 2001-311976 A | 11/2001 |
| JP | 2002-107787 A | 4/2002 |
| JP | 2002-214659 A | 7/2002 |
| JP | 2002-330335 A | 11/2002 |
| JP | 2003-043540 A | 2/2003 |
| JP | 2004-080457 A | 3/2004 |
| JP | 2004-120014 A | 4/2004 |
| JP | 2004-289376 A | 10/2004 |

OTHER PUBLICATIONS

Japanese Office Action dated Jan. 31, 2011 (and English translation thereof) in counterpart Japanese Application No. 2006-027968.

* cited by examiner

FIG. 7A
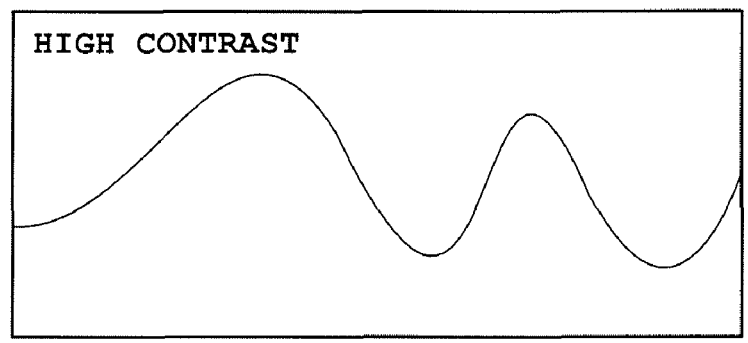
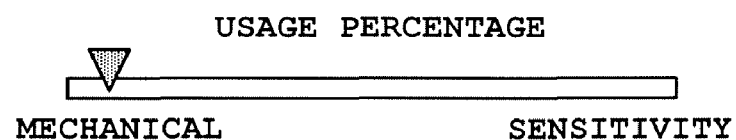
FIG. 7B
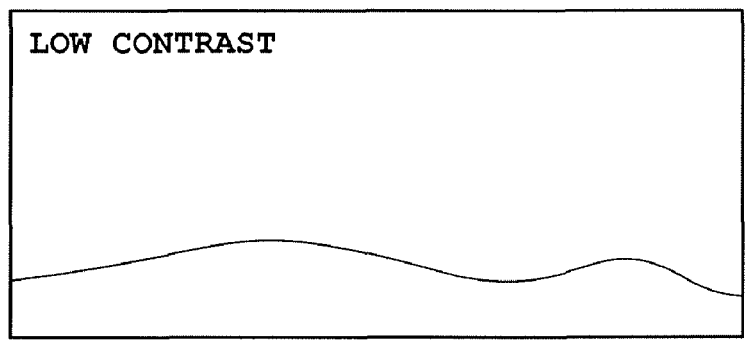
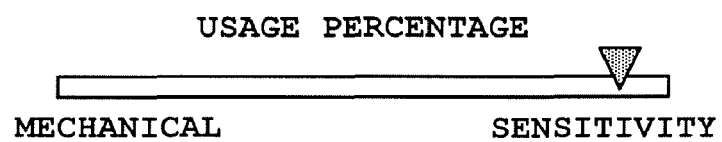

IMAGING DEVICE WITH IMAGE BLURRING REDUCTION FUNCTION

CROSS-REFERENCE TO RELATED APPLICATION

This application is a continuation application of U.S. application Ser. No. 11/701,873 filed Feb. 2, 2007 now U.S. Pat. No. 7,853,134, which is based upon and claims the benefit of priority from the prior Japanese Patent Application No. 2006-027968, filed Feb. 6, 2006, the entire contents of which is incorporated herein by reference.

BACKGROUND OF THE INVENTION

1. Field of the Invention

The present invention relates to an imaging device and an image blurring reduction method. The imaging device can be used in a digital camera and includes an image blurring reduction function.

2. Description of the Related Art

Conventionally, an imaging device, such as a digital camera, uses various image blurring reduction methods to reduce image blurring.

For example, the imaging device uses the following methods. The imaging device optically corrects the image blurring by detecting camera-shake (this concept includes hand shake and other similar situations) using an angular velocity sensor, such as a gyro-sensor, and moving an imaging element, such as a charge-coupled device (CCD), an imaging lens, or the like depending on the detected amount of camera-shake. Alternatively, the imaging device reduces the image blurring by sensitizing shooting sensitivity and increasing shutter speed.

The following technology is known as a (hybrid) technology combining a plurality of blurring reduction methods to correct the blurring in an image. A mechanical vibration control device and an electronic vibration control device are used in combination. When the battery becomes lower than a predetermined value, the mechanical vibration control device having a high power consumption is eliminated and only the electronic vibration control device having a low power consumption is used to reduce the blurring in the image (for example, refer to Japanese Laid-Open (Kokai) Patent Publication No. 2001-311976).

SUMMARY OF THE INVENTION

In accordance with an aspect of the present invention, there is provided an imaging device including: an image pickup section for imaging a subject and outputting image data an image blurring correction section for correcting image blurring; an image blurring reduction section for reducing image blurring; a detection section for detecting image shake based on image data to which image blurring correction has been performed by the image blurring correction section; and a control section for controlling an amount of the image blurring reduction performed by the image blurring reduction section, based on the image shake detected by the detection section.

In accordance with another aspect of the present invention, there is provided an imaging device comprising: an image pickup section for imaging a subject and outputting image data; an image blurring correction section for correcting image blurring; an image blurring reduction section for reducing image blurring; a detection section for detecting subject distance; and a control section for controlling an amount of the image blurring reduction performed by the image blurring reduction section based on the subject distance detected by the detection section.

In accordance with another aspect of the present invention, there is provided an imaging device comprising: an image pickup section for imaging a subject and outputting image data; an image blurring correction section for correcting image blurring; an image blurring reduction section for reducing image blurring; a setting section for setting a percentage of an amount of image blurring correction performed by the image blurring correction section and an amount of image blurring reduction performed by the image blurring reduction section; and a control section for making the image blurring correction section perform the image blurring correction and the image blurring reduction section perform the image blurring reduction, depending on the percentage set by the setting section.

In accordance with another aspect of the present invention, there is provided an image blurring reduction method which is used by an imaging device including an image pickup section for imaging a subject and outputting image data, an image blurring correction section for correcting image blurring, and an image blurring reduction section for reducing image blurring, the image blurring reduction method comprising: a detection step of detecting image shake based on image data to which image blurring correction has been performed by the image blurring correction section; and a control step of controlling an amount of image blurring reduction performed by the image blurring reduction section based on the image shake detected at the detection step.

In accordance with another aspect of the present invention, there is provided a computer program product for an imaging device including an image pickup section for imaging a subject and outputting image data, stored on a computer-readable medium, comprising: an image blurring correction process for correcting image blurring; an image blurring reduction process for reducing image blurring; a detection process for detecting image shake based on image data to which image blurring correction has been performed by the image blurring correction process; and a control process for controlling an amount of image blurring reduction performed by the image blurring reduction process, based on the image shake detected by the detection process.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 7A and FIG. 7B are diagrams of usage percentages corresponding to detected contrast elements.

DETAILED DESCRIPTION OF THE PREFERRED EMBODIMENTS

The present invention will hereinafter be described in detail with reference to the preferred embodiments shown in the accompanying drawings.

A. First Embodiment

A-1. Configuration of the Digital Camera

Figure 1:
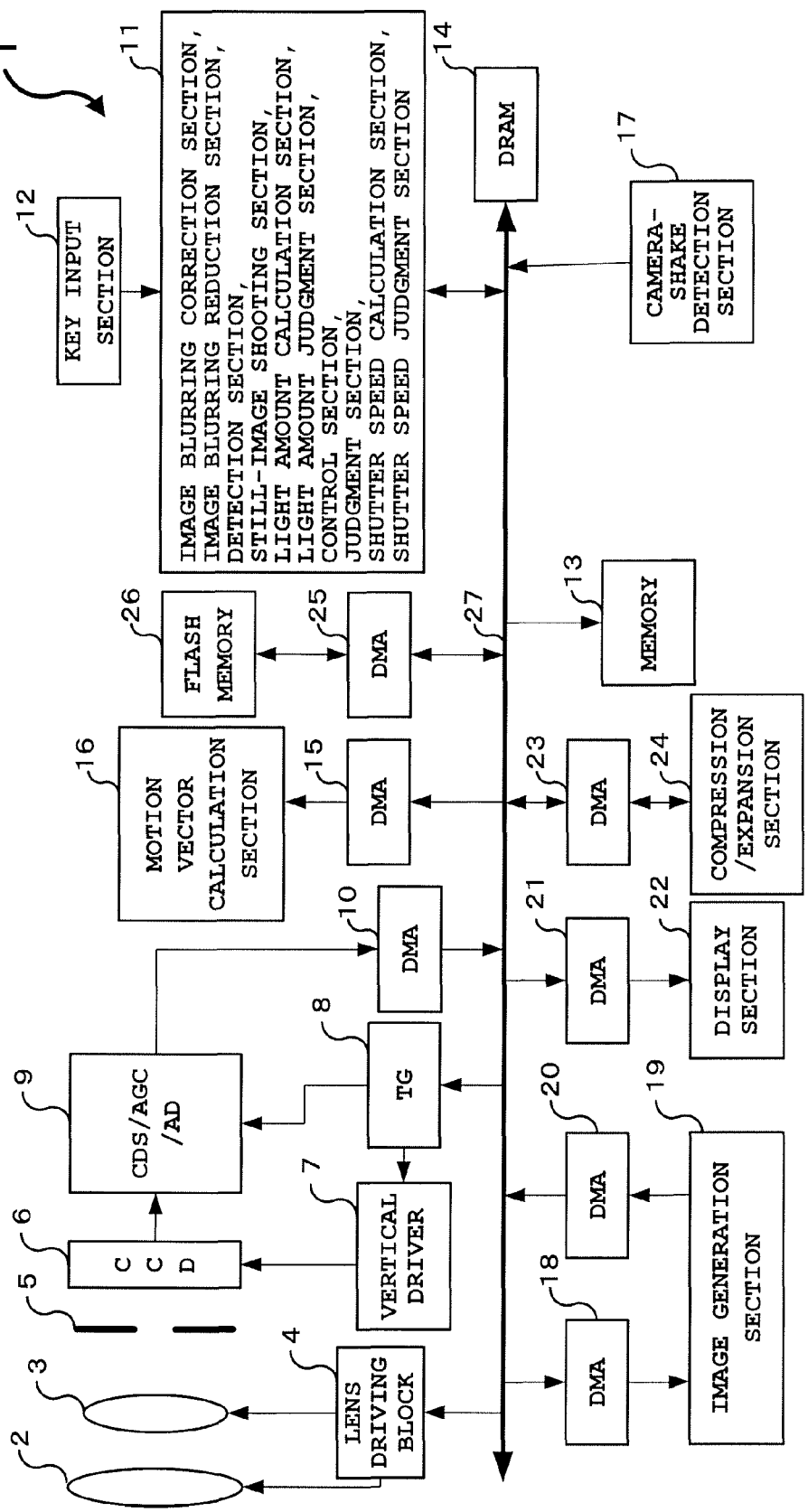
FIG. 1 is a block diagram of a digital camera according to an embodiment of the present invention.

FIG. 1 is a block diagram of an electrical schematic of a digital camera 1 that actualizes an imaging device of the present invention.

The digital camera 1 includes an imaging lens 2, a correction lens 3, a lens driving block 4, a combination aperture and shutter 5, a CCD 6, a vertical driver 7, a timing generator (TG) 8, a unit circuit 9, a direct memory access (DMA) controller (hereinafter, referred to as DMA) 10, a central processing unit (CPU) 11, a key input section 12, a memory 13, a dynamic random access memory (DRAM) 14, a DMA 15, a motion vector calculation section 16, a camera-shake detection section 17, a DMA 18, an image generation section 19, a DMA 20, a DMA 21, a display section 22, a DMA 23, a compression/expansion section 24, a DMA 25, a flash memory 26, and a bus 27.

The imaging lens 2 includes a focus lens and a zoom lens formed from a plurality of lens groups.

The lens driving block 4 includes a driving circuit (not shown). The driving circuit respectively moves the focus lens and the zoom lens in an optical axis direction, in adherence to a control signal from the CPU 11.

The correction lens 3 is used to correct blurring in an image caused by camera-shake (for example, hand-shake). The correction lens 3 is connected to the lens driving block 4.

The lens driving block 4 corrects the image blurring by moving the correction lens 3 in a yaw direction and a pitch direction. The lens driving block 4 includes a motor and a motor driver. The motor moves the correction lens 3 in the yaw direction and the pitch direction. The motor driver drives the motor.

The combination aperture and shutter 5 includes a driving circuit (not shown). The driving circuit operates the combination aperture and shutter 5 in adherence to a control signal sent from the CPU 11. The combination aperture and shutter 5 functions as a mechanical aperture and a mechanical shutter.

The mechanical aperture refers to a mechanism used to control the amount of light incident on the CCD 6. The mechanical shutter refers to a mechanism used to control the amount of time the light is incident on the CCD 6. The amount of time the light is incident on the CCD 6 (exposure time) varies depending on the shutter speed.

The exposure amount is determined by an aperture value (the extent to which the aperture is opened) and the shutter speed.

The vertical driver 7 scan-drives the CCD 6. The CCD 6 photo-electrically converts the light intensity of the respective colors in the RGB value of a subject image at a constant cycle and outputs the light intensity to the unit circuit 9 as an imaging signal. The CPU 11 controls the operation timings of the vertical driver 7 and the unit circuit 9, via the TG 8.

The TG 8 is connected to the unit circuit 9. The unit circuit 9 includes a correlated double sampling (CDS) circuit, an automatic gain control (AGC) circuit, and an analog-to-digital (A/D) converter. The CDS circuit performs correlated double sampling on the imaging signal outputted from the CCD 6 and holds the sampled imaging signal. The AGC circuit performs automatic gain control on the sampled imaging signal. The A/D converter converts the automatic-gain-controlled analog imaging signal to a digital signal. The DMA 10 controls storing of the imaging signal obtained by the CCD 6 in the DRAM 14 (buffer memory) in a Bayer data (raw data) state, via the unit circuit 9.

The CPU 11 is a one-chip microcomputer having functions that perform an automatic exposure (AE) process and an automatic focus (AF) process. The CPU 11 controls each section of the digital camera 1.

Specifically, depending on imaging conditions, the CPU 11 sets the usage percentages (ratio) of a sensitivity image blurring reduction function and a mechanical/electronic image blurring correction function. The usage percentages indicate the percentages of image blurring caused by camera-shake and subject-blurring that can be reduced through the use of the sensitivity image blurring reduction function and through the use of the mechanical/electronic image blurring correction function. For example, when the usage percentages are set so that the sensitivity image blurring reduction function is 40% and the mechanical/electronic image blurring correction function is 60%, the image blurring is reduced by 40% through the use of the sensitivity image blurring reduction function and 60% through the use of the mechanical/electronic image blurring correction function. As a result, the image blurring can be reduced by 100% through the combined use of the sensitivity image blurring reduction function and the mechanical/electronic image blurring correction function.

The sensitivity image blurring reduction function refers to reducing the image blurring by sensitizing the shooting sensitivity and increasing the shutter speed by the amount of sensitization of the shooting sensitivity. "Sensitizing the shooting sensitivity" refers to an operation that increases the luminosity of the picked-up image. Specific methods used to increase the luminosity of the picked-up image include a method in which the amplification factor (gain) of an imaging signal is increased, a method in which the CCD 6 is pixel-addition-driven, and a method in which a pixel addition process is performed on the imaging signal outputted from the CCD 6. When sensitizing the shooting sensitivity through pixel addition, the shooting sensitivity is controlled using a method in which whether the pixel addition is performed is controlled, the number of added pixels is increased or decreased, or the like. In the present embodiment, the shooting sensitivity is sensitized by increasing the gain.

The mechanical/electronic image blurring correction function refers to image blurring correction methods excluding the sensitivity image blurring reduction.

For example, the following methods can be used to correct the image blurring. The correction lens, imaging lens, or the imaging element is moved in a direction perpendicular to the optical axis, based on a camera-shake amount outputted from an angular velocity sensor, such as a gyro-sensor, or a motion vector amount obtained from the image data (the mechanical image blurring correction function). Alternatively, the trimming range of the image data is changed, based on the camera-shake amount outputted from the gyro-sensor or the motion vector amount obtained from the image data (the electronic image blurring correction function). According to the embodiment, the image blurring is corrected by the correction lens being moved in a direction perpendicular to the optical axis (the mechanical image blurring correction function).

The key input section 12 includes a plurality of operation keys, such as a shutter button, a mode-switching key, a cross key, and a SET key. The shutter button can be operated by being half-pressed and fully-pressed. The key input section 12 outputs operation signals to the CPU 11 depending on the key operations performed by the user.

The memory 13 is a non-volatile memory to which control programs (for example, programs required to perform the AE process and the AF process) and data (for example, a usage percentage table) are recorded. The recorded control programs and data are required by the CPU 11 to control each section of the digital camera 1. According to the embodiment, in particular, programs used to allow the CPU 11 to function as an image blurring correction section, an image blurring reduction section, a detection section, a control section, a judgment section, a still-image pickup section, a light amount calculation section, a light amount judgment section, a shutter speed calculation section, and a shutter speed judgment section of the present invention are recorded in the memory 13. The CPU 11 operates in adherence to the programs recorded in the memory 13.

The DRAM 14 is used as a buffer memory that temporarily stores the image data picked up by the CCD 6 and a working memory of the CPU 11.

The DMA 15 reads the image data of the Bayer data stored in the buffer memory or the image data of the luminosity color-difference signal and outputs the read image data to the motion vector calculation section 16.

The motion vector calculation section 16 calculates the motion vector of a frame (image data) using a representative point matching method, a block matching method, or the like. The motion vector calculation section 16 calculates the motion vector based on the image data of the frame of which the motion vector is to be calculated and the frame that has been imaged immediately before the frame of which the motion vector is to be calculated. Therefore, the motion vector calculation section 16 includes a memory circuit that temporarily stores the preceding frame.

The camera-shake detection section 17 includes the angular velocity sensor, such as the gyro-sensor (not shown), and detects the camera-shake amount caused by the camera operator.

The camera-shake detection section 17 includes a gyro-sensor that detects the camera-shake amount in the yaw direction and a gyro-sensor that detects the camera-shake amount in the pitch direction.

The camera-shake amount detected by the camera-shake detection section 17 is sent to the CPU 11.

The DMA 18 reads the image data of the Bayer data stored in the buffer memory and outputs the read image data to the image generation section 19.

The image generation section 19 performs processes such as pixel interpolation processing, gamma (γ) correction processing, and white balance processing. In addition, the image generation section 19 generates a luminosity color-difference signal (YUV data). In other words, the image generation section 19 performs image processing.

The DMA 20 stores luminosity color-difference image data (YUV data) to which image processing has been performed by the image generation section 19 in the buffer memory.

The DMA 21 outputs the YUV data stored in the buffer memory to the display section 22.

The display section 22 includes a color liquid crystal display (LCD) and a driving circuit for the color LCD. The display section 22 displays an image based on the YUV data outputted from the DMA 21.

The DMA 23 outputs the YUV data and compressed image data stored in the buffer memory to the compression/expansion section 24. The DMA 23 also stores the image data compressed or expanded by the compression/expansion section 24 in the buffer memory.

The compression/expansion section 24 compresses or expands the image data (for example, compression and expansion in a joint photographic experts group [JPEG] format or a moving picture experts group [MPEG] format).

The DMA 25 reads the compressed image data stored in the buffer memory and records the read image data in the flash memory 26. The DMA 25 also reads the compressed image data recorded in the flash memory 26 and stores the read image data in the buffer memory.

A-2. Operations of the Digital Camera

Next, the functions of each configuration of the digital camera 1 in the present invention will be described.

The operations performed by the digital camera 1 according to a first embodiment will be described, with reference to the flowchart in FIG. 2.

When the user sets the digital camera 1 to hybrid shooting mode by operating the mode switching key in the key input section 12, the CPU 11 starts a so-called through image process (moving image) display (Step S1). In the through image process display, the CPU 11 starts imaging a subject using the CCD 6, stores the image data of the luminosity color-difference signal generated from the picked-up image data in the buffer memory, and displays the stored image data in the display section 22. When the user sets the digital camera 1 to hybrid shooting mode, the CPU 11 also starts camera-shake detection using the camera-shake detection section 17.

Next, the CPU 11 starts a mechanical image blurring correction (Step S2). Specifically, the CPU 11 starts an operation to acquire the camera-shake amount (the camera-shake amount in the yaw direction and the camera-shake amount in the pitch direction) detected by the camera-shake detection section 17 and drive the correction lens 3 based on the acquired camera-shake amount. As a result, the image of the image data outputted from the CCD 6 becomes an image without camera-shake caused by camera-shake.

Next, the CPU 11 acquires a frame by storing the image data (Bayer data) of one frame outputted from the CCD 6 with the start of the through image process display in the buffer memory (Step S3). The CPU 11 outputs the acquired Bayer data to the image generation section 19, via the DMA 18. The image generation section 19 performs the white balance processing and the luminosity color-difference signal (YUV data) generation processing. Then, the CPU 11 stores the luminosity color-difference signal in the buffer memory, via the DMA 20.

Next, the CPU 11 performs the AE process (Step S4). In other words, the CPU 11 calculates the exposure amount based on the luminosity element in the acquired image data. The CPU 11 sets the shutter speed, the aperture value, the gain amount, and the like based on the calculated exposure amount. The CPU 11 sets the shutter speed and the like based on an AE program chart for through images process stored in the memory 13 in advance.

Next, the CPU 11 makes the motion vector calculation section 16 calculate the motion vector of the image data of the frame by the motion vector calculation section 16 acquiring the image data of the Bayer data (or YUV data) stored in the buffer memory at Step S3, via the DMA 15 (Step S5). Then, the CPU 11 acquires the calculated motion vector. The calculated motion vector directly becomes a blur vector of the subject. This is because the camera-shake in the image picked up by the CCD 6 is corrected in advance, since the mechanical image blurring correction has been performed. Therefore, the detected camera-shake vector directly becomes the blur vector of the subject.

The current frame data (the frame of which the motion vector is to be calculated) and the frame data immediately before the current frame data are required for the calculation of the motion vector. Therefore, the motion vector of the first frame to be imaged cannot be calculated, and the motion vector cannot be acquired.

Next, the CPU 11 judges whether the size of the acquired motion vector (the shake amount of the subject) is greater than a predetermined value (Step S6). The predetermined value is recorded in the memory 13 in advance.

When judged at Step S6 that the shake amount of the subject is not greater than the predetermined value or, namely, that the shake amount is small, the subject-shake is minimal and the blurring correction can be handled by only camera-shake correction. Therefore, the CPU 11 sets the usage percentage of the mechanical image blurring correction to 100% (the usage percentage of the sensitivity-type image blurring reduction is 0%) (Step S7), and proceeds to Step S9. In other words, the image blurring reduction is performed through the use of only the mechanical image blurring correction. The set usage percentages are stored in a usage percentage storing area within an internal memory of the CPU 11.

At the same time, when judged at Step S6 that the shake amount of the subject is greater than the predetermined value, the CPU 11 sets the usage percentages of the mechanical image blurring correction and the sensitivity-type image blurring reduction, based on the calculated shake amount of the subject and the usage percentage table recorded in the memory 13, (Step S8) and proceeds to Step 9.

The usage percentages set herein are used for blurring reduction when still-images are shot.

Figure 3A:
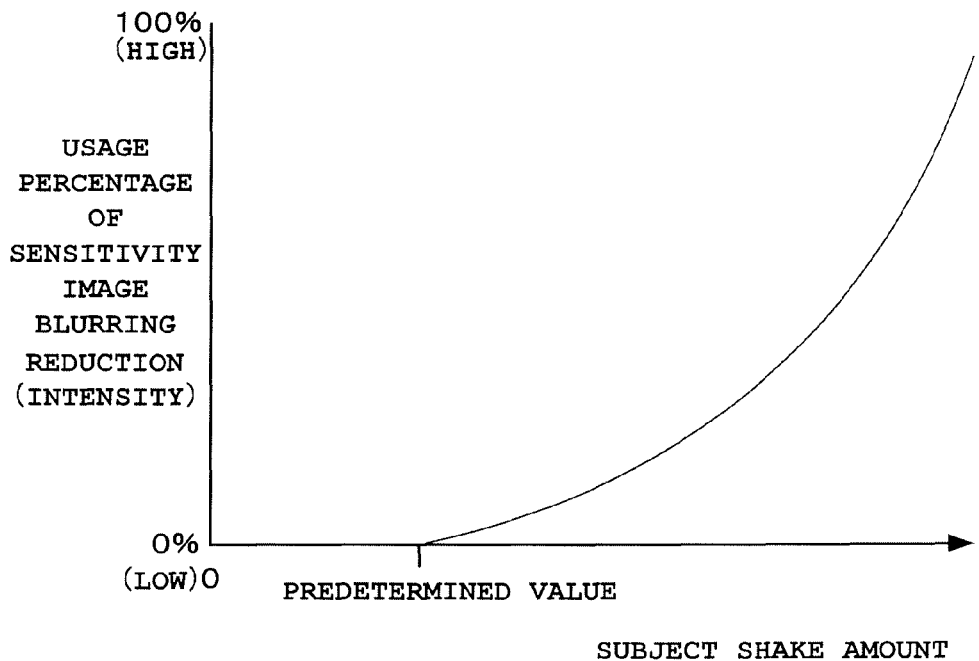
FIG. 3A and FIG. 3B are diagrams of usage percentage tables stored in a memory 13.

FIG. 3A shows the usage percentage table recorded in the memory 13.

As is clear from the diagram, the usage percentage (intensity) of the sensitivity image blurring reduction increases as the subject-shake amount becomes greater than the predetermined value. On the other hand, when the subject-shake amount is less than the predetermined value, the usage percentage (intensity) of the sensitivity image blurring reduction becomes 0%.

In other words, when the subject-shake amount is less than the predetermined value, the subject-shake can be considered minimal. Therefore, the blurring process can be handled by only the mechanical image blurring correction. When the subject-shake amount is greater than the predetermined value, the usage percentage (intensity) of the sensitivity image blurring amount is increased as the subject-shake amount increases. Inversely, the usage percentage (intensity) of the mechanical image blurring correction is decreased.

Specifically, for example, when the mechanical image blurring correction is set to 80% and the sensitivity image blurring reduction is set to 20% based on the usage percentage table, and the image blurring caused by camera-shake accounts for 80% of the image blurring caused by camera-shake and subject-shake, all image blurring caused by camera-shake can be eliminated by fully operating the mechanical image blurring correction function. In addition, the sensitivity image blurring reduction is performed at an intensity that is sufficient for eliminating the 20% of image blurring caused by the subject-shake.

When the image blurring caused by camera-shake exceeds 80% (for example, accounts for 90%), the capacity of the mechanical image blurring correction function is limited to a level that eliminates only ⅔ of the image blurring caused by camera-shake. The sensitivity image blurring reduction is performed at an intensity that is sufficient for eliminating the remaining 10% of the image blurring caused by camera-shake, which could not be eliminated by the mechanical image blurring correction, and the 10% of the image blurring caused by subject-shake.

When the image blurring caused by camera-shake is less than 80% (for example, accounts for 50%), all of the image blurring caused by camera-shake (50%) and the 30% of image blurring caused by subject-shake can be eliminated by fully operating the mechanical image blurring correction function. The sensitivity image blurring reduction is performed at an intensity that is sufficient for eliminating the remaining 20% of the image blurring caused by subject-shake. The mechanical image blurring correction function corrects the image blurring by moving the correction lens in a direction perpendicular to the optical axis, based on the camera-shake amount that is a sum of the camera-shake amount detected by the camera-shake detection section 17 and ⅗ of the subject-shake amount calculated by the motion vector calculation section 16.

The percentages of the image blurring caused by camera-shake and the image blurring caused by subject-shake can be acquired by the percentages of the camera-shake amount detected by the camera-shake detection section 17 and the subject-shake amount calculated by the motion vector calculation section 16 being determined.

As is clear from the foregoing description, unnecessary sensitivity image blurring reduction is not performed and the image quality is not needlessly degraded.

At Step S9, the CPU 11 displays the image data (YUV data) of the frame stored in the buffer memory, acquired at Step S3, in the display section 22, via the DMA 21.

Next, the CPU 11 judges whether the user has half-pressed the shutter button (Step S10). Here, the CPU 11 judges whether the operation signal corresponding to the shutter button being half-pressed is sent from the key input section 12.

When judged at Step S10 that the shutter button is not half-pressed, the CPU 11 returns to Step S3, acquires the image data of the next frame that has been imaged and repeats the operation described above.

At the same time, when judged at Step S10 that the shutter button is half-pressed, the CPU 11 sets the shutter speed, the aperture value, and the gain amount based on the luminosity element of the through image process data imaged immediately before the shutter button has been half-pressed and the usage percentage set most recently (Step S11). The CPU 11 sets the shutter speed and the like based on an AE program chart that takes into consideration the usage percentages for shooting still-images.

The shutter speed and the like can be set based on the AE process. The set shutter speed and the like can be reset depending on the usage percentages. The shutter speed and the like set during the AE process at this time are set based on the normal AE program chart that does not take into consideration the usage percentages for shooting still-images.

Next, the CPU 11 performs the AF process (Step S12). The CPU 11 performs the AF process using a contrast detection method as the AF process method. Therefore, the CPU 11 moves the focus lens from one lens end (a lens position in which the subject closest to the camera operator is in focus) to the other lens end (search movement). The CPU 11 calculates an AF evaluation value of an AF area in each lens position and detects a peak AF evaluation value of the AF areas. When the peak is detected, the CPU 11 stops the search movement and moves the focus lens to the lens position from which the peak has been detected, thereby bringing the subject into focus.

Next, the CPU 11 judges whether the user has fully-pressed the shutter button (Step S13). Here, the CPU 11 judges whether the operation signal corresponding with the shutter button being fully pressed is sent from the key input section 12.

When judged at Step S13 that the shutter button is not fully pressed, the CPU 11 remains at Step S13 until the shutter button is fully pressed. When judged that the shutter button is fully pressed, the CPU 11 starts exposure according to the shutter speed and the aperture value set at Step S11 (Step S14). In other words, the CPU 11 projects the light of the subject to the CCD 6, via the imaging lens 2 or the like.

Next, the CPU 11 acquires the camera-shake amount (the camera-shake amount in the yaw direction and the camera-shake amount in the pitch direction) detected by the camera-shake detection section 17 (Step S15). Then, the CPU 11 performs the image blurring correction by driving the correction lens 3 based on the acquired camera-shake amount (Step S16).

The CPU 11 changes the driving amount by which the correction lens 3 is driven depending on the usage percentage of the mechanical image blurring correction. For example, when the usage percentage of the mechanical image blurring correction is 100%, the CPU 11 corrects the image blurring by moving correction lens 3 within the driving range of the correction lens 3 using the detected camera-shake amount. When the usage percentage is not 100% (when the sensitivity image blurring reduction is also performed) and the percentage of the image blurring caused by camera-shake is higher than the usage percentage of the mechanical image blurring correction, the CPU 11 corrects the image blurring by reducing the blurring amount detected by the camera-shake detection section 17, depending on the usage percentage of the mechanical image blurring correction and the percentage of the image blurring caused by camera-shake, and moving the correction lens 3. Alternatively, the CPU 11 corrects the image blurring by limiting the driving range of the correction lens 3, depending on the usage percentage of the mechanical image blurring correction and the percentage of the image blurring caused by camera-shake.

In other words, when the usage percentage of the mechanical image blurring correction is 100%, camera-shake is handled using only the mechanical image blurring correction. When the usage percentage of the mechanical image blurring correction is not 100% and the percentage of the image blurring caused by camera-shake is higher than the usage percentage of the mechanical image blurring correction, the image blurring caused by camera shake is reduced using the mechanical image blurring correction and the sensitivity image blurring reduction. Therefore, the CPU 11 reduces the camera-shake amount detected by the camera-shake detection section 17, depending on the usage percentage of the mechanical image blurring correction and the percentage of the image blurring caused by camera-shake, and performs the mechanical image blurring correction. When the usage percentage of the mechanical image blurring correction is 0% (the usage percentage of the sensitivity image blurring reduction is 100%), the CPU 11 does not drive the correction lens 3 and reduces the image blurring caused by camera-shake and subject-shake using only the sensitivity image blurring reduction.

Next, the CPU 11 judges whether the exposure is completed (Step S17). In other words, the CPU 11 judges whether the exposure time set at Step S11 has elapsed.

When judged at Step S17 that the exposure is not completed, the CPU 11 returns to Step S15 and repeats the operation described above.

When judged at Step S17 that the exposure is completed, the CPU 11 reads the electrical charges accumulated in the CCD 6 (still-image data) and stores the read electrical charges in the buffer memory, via the DMA 10. The compression/expansion section 24 compresses the still-image data (YUV data) to which image processing has been performed by the image generation section 19. The CPU 11 records the compressed still-image data in the flash memory 26, via the DMA 25 (Step S18).

At this time, the unit circuit 9 performs automatic gain control on the still-image data read from the CCD 6, based on the gain amount set at Step S11.

As described above, according to the first embodiment, when the shake amount of the subject is calculated and the calculated shake amount of the subject is less than the predetermined value, the CPU 11 sets the usage percentage of the mechanical image blurring correction to 100% and performs the image blurring correction. Therefore, image correction appropriate for the property and state of the blurring can be performed. In this case, the sensitivity image blurring reduction is not performed. Therefore, the image quality is not needlessly degraded.

In addition, when the calculated shake amount of the subject is greater than the predetermined value, the CPU 11 sets the usage percentages for the extent of blurring reduced using the mechanical image blurring correction and the extent of blurring reduced using the sensitivity image blurring reduction, depending on the shake amount of the subject. Therefore, unnecessary sensitivity image blurring correction is not performed and the degradation of the image quality can be kept at a required minimum.

B. Second Embodiment

Next, a second embodiment will be described.

According to the first embodiment, the CPU 11 calculates the shake amount of the subject, sets the usage percentages of the mechanical image blurring correction and the sensitivity image blurring reduction depending on the calculated shake amount of the subject, and performs the image correction. However, in the second embodiment, the CPU 11 calculates the distance from the digital camera 1 to the subject and sets the usage percentages of the mechanical image blurring correction and the sensitivity image blurring reduction depending on the distance to the subject. This is because the subject-shake becomes less of a problem and the camera-shake becomes more of a problem the farther the subject is from the digital camera 1. The subject-shake, in addition to the camera-shake, becomes a problem the closer the subject is to the digital camera 1.

C. Operations of the Digital Camera According to the Second Embodiment

The imaging device according to the second embodiment of the present invention is actualized using the digital camera 1 having the same configuration as that shown in FIG. 1.

The operations of the digital camera 1 according to the second embodiment are described with reference to the flowchart in FIG. 4.

When the user sets the digital camera 1 to hybrid shooting mode by operating the mode switching key in the key input section 12, the CPU 11 starts a so-called through image process display (Step S31). In the through image process display, the CPU 11 starts imaging using the CCD 6 and sequentially displays picked-up through images of the subject in the display section 22.

Next, the CPU 11 starts a continuous AF process (Step S32). This continuous AF process is defined as the AF process which is continuously performed. Here, the AF process using the contrast detection method is performed. Therefore, the AF process using the contrast detection method is continuously preformed.

Next, the CPU 11 performs the AE process (Step S33). In other words, the CPU 11 calculates the exposure amount based on the luminosity element of the picked-up image data and sets the shutter speed, the aperture value, the gain amount, and the like based on the calculated exposure amount. The shutter speed and the like are set based on the AE program chart for through images.

Next, the CPU 11 judges whether a focus position (a focused lens position) is detected by the continuous AF process (Step S34).

When judged at Step S34 that the focus position is not detected, the CPU 11 proceeds to Step S39. When judged that the focus point is detected, the CPU 11 calculates the distance to the subject (subject distance) based on the focus position (Step S35).

Next, the CPU 11 judges whether the calculated subject distance is less than a predetermined value (predetermined distance) (Step S36). The predetermined value is recorded in the memory 13 in advance. The CPU 11 can judge whether the subject distance is less than the predetermine value based on the focus position, without calculating the subject distance.

When judged at Step S36 that the subject distance is not less than the predetermined value (the subject is not closer than the predetermined distance) or, namely, the subject distance is long (the subject is farther than the predetermined distance), the subject is in a position that is far from the digital camera 1. Although the subject-shake is not very noticeable, the camera-shake is noticeable. Therefore, the CPU 11 sets the usage percentage of the mechanical image blurring correction to 100% (the usage percentage of the sensitivity image blurring reduction is 0%) (Step S37) and proceeds to Step S39. The set usage percentage is stored in the usage percentage storing area within the internal memory of the CPU 11.

At the same time, when judged at Step S36 that the subject distance is less than the predetermined value, the CPU 11 sets the usage percentages of the mechanical image blurring correction and the sensitivity image blurring reduction based on the calculated subject distance and the usage percentage table recorded in the memory 13 (Step S38). Then, the CPU 11 proceeds to Step S39.

Figure 3B:
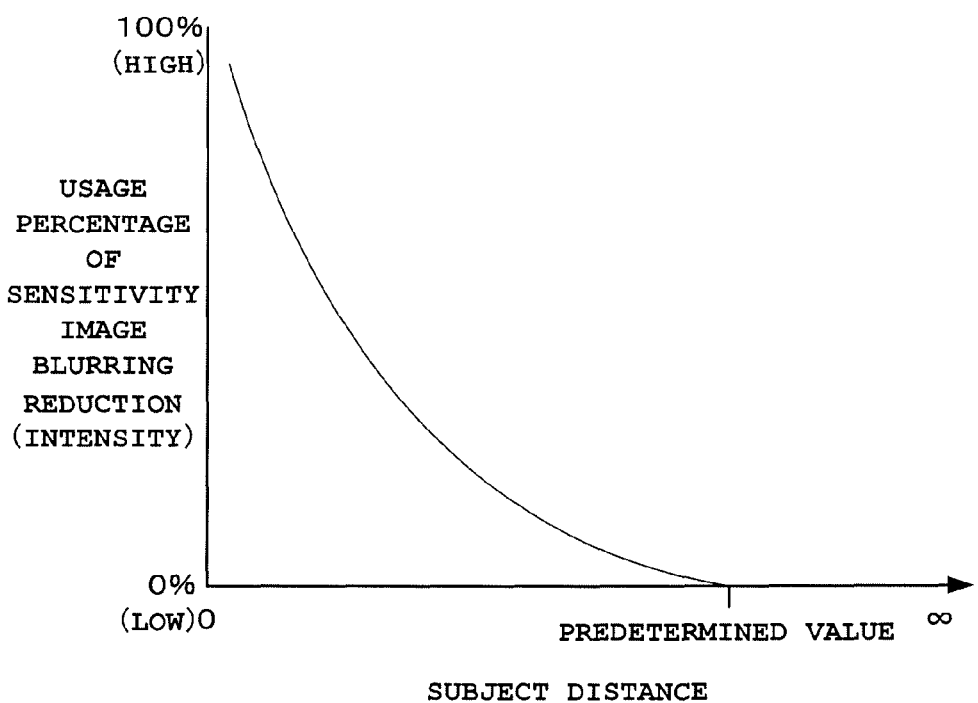

FIG. 3B is a usage percentage table recorded in the memory 13 according to the second embodiment.

As is clear from the diagram, the usage percentage (intensity) of the sensitivity image blurring reduction decreases as the subject distance becomes longer. When the subject distance reaches the predetermined value, the usage percentage (intensity) of the sensitivity image blurring reduction is 0%.

In other words, when the subject distance is less than the predetermined value, the subject-shake is noticeable. Therefore, the usage percentage (intensity) of the sensitivity image blurring reduction is decreased as the subject distance becomes longer. When the subject distance becomes longer than the predetermined distance, the subject-shake becomes barely noticeable. Therefore, the blurring process is handled using only the mechanical image blurring correction.

At Step S39, the CPU 11 judges whether the user has half-pressed the shutter button.

When judged at Step S39 that the shutter button is not half-pressed, the CPU 11 returns to Step S33 and repeats the operation described above.

At the same time, when judged at Step S39 that the shutter button is half-pressed, the CPU 11 sets the shutter speed, the aperture value, and the gain amount based on the luminosity element of the through image process data imaged immediately before the shutter button has been half-pressed and the usage percentage set most recently (Step S40). The CPU 11 sets the shutter speed and the like based on the AE program chart that takes into consideration the usage percentages for shooting still-images.

The shutter speed and the like can be set based on the AE process. The set shutter speed and the like can be reset depending on the usage percentages. The shutter speed and the like set during the AE process at this time are set based on the normal AE program chart that does not take into consideration the usage percentages for shooting still-images.

Next, the CPU 11 performs the AF process using the contrast detection method (Step S41).

Then, the CPU 11 judges whether the user has fully-pressed the shutter button (Step S42).

When judged at Step S42 that the shutter button is not fully pressed, the CPU 11 remains at Step S42 until the shutter button is fully pressed. When judged that the shutter button is fully pressed, the CPU 11 starts exposure according to the shutter speed and the aperture value set at Step S40 (Step S43).

Next, the CPU 11 acquires the camera-shake amount (the camera-shake amount in the yaw direction and the camera-shake amount in the pitch direction) detected by the camera-shake detection section 17 (Step S44). Then, the CPU 11 performs the image blurring correction by driving the correction lens 3 based on the acquired camera-shake amount (Step S45).

The CPU 11 changes the driving amount by which the correction lens 3 is driven depending on the usage percentage of the mechanical image blurring correction. For example, when the usage percentage of the mechanical image blurring correction is 100%, the CPU 11 corrects the image blurring by moving the correction lens 3 within the driving range of the correction lens 3, using the camera-shake amount detected by the camera-shake detection section 17. When the usage percentage is not 100% (when the sensitivity image blurring reduction is also performed) and the percentage of the image blurring caused by camera-shake is higher than the usage percentage of the mechanical image blurring correction, the CPU 11 corrects the image blurring by reducing the camera-shake amount detected by the camera-shake detection section 17, depending on the usage percentage of the mechanical image blurring correction and the percentage of the image blurring caused by camera-shake, and moving the correction lens 3. Alternatively, the CPU 11 corrects the image blurring by limiting the driving range of the correction lens 3, depending on the usage percentage of the mechanical image blurring correction and the percentage of the image blurring caused by camera-shake.

In other words, when the usage percentage of the mechanical image blurring correction is 100%, the image blurring caused by camera-shake is handled using only the mechanical image blurring correction. When the usage percentage of the mechanical image blurring correction is not 100% and the percentage of the image blurring caused by camera-shake is higher than the usage percentage of the mechanical image blurring correction, the image blurring caused by camera shake is reduced using the mechanical image blurring correction and the sensitivity image blurring reduction. Therefore, the CPU 11 reduces the camera-shake amount detected by the camera-shake detection section 17, depending on the usage percentage of the mechanical image blurring correction and the percentage of the image blurring caused by camera-shake, and performs the mechanical image blurring correction. When the usage percentage of the mechanical image blurring correction is 0% (the usage percentage of the sensitivity image blurring reduction is 100%), the CPU 11 does not drive the correction lens 3 and reduces the image blurring caused by camera-shake and subject-shake using only the sensitivity image blurring reduction.

Next, the CPU 11 judges whether the exposure is completed (Step S46). In other words, the CPU 11 judges whether the exposure time set at Step S40 has elapsed.

When judged at Step S46 that the exposure is not completed, the CPU 11 returns to Step S44 and repeats the operation described above.

At the same time, when judged at Step S46 that the exposure is completed, the CPU 11 reads the electrical charges accumulated in the CCD 6 (image data) and uses the image generation section 19 to perform image processing. Then, the CPU 11 records the still-image data compressed by the compression/expansion section 24 in the flash memory 26 (Step S47).

At this time, the unit circuit 9 performs automatic gain control on the still-image data read from the CCD 6, based on the gain amount set at Step S40.

As described above, according to the second embodiment, when the subject distance is calculated and the calculated subject distance is greater than the predetermined value (when the camera-shake is more noticeable than the subject-shake), the CPU 11 sets the usage percentage of the mechanical image blurring correction to 100% and performs the image blurring correction. Therefore, image correction appropriate for the property of the blurring can be performed. In this case, the sensitivity image blurring reduction is not performed. Therefore, the image quality is not needlessly degraded.

In addition, when the calculated subject distance is less than the predetermined value (when the camera-shake and the subject-shake are noticeable), the CPU 11 sets the usage percentages for the extent of blurring corrected using the mechanical image blurring correction and the extent of blurring reduced using the sensitivity image blurring reduction, depending on the subject distance. Therefore, unnecessary sensitivity image blurring correction is not performed and the degradation of the image quality can be kept at a required minimum.

D. Variation Examples

The following variation examples are possible according to the above embodiment.

(1) According to the first and second embodiments, the usage percentages of the mechanical image blurring correction and the sensitivity image blurring reduction are simply set depending on the shake amount of the subject or the subject distance. However, when the shutter speed set during the AE process is faster than a predetermined value, the usage percentage of the mechanical image blurring correction can be set to 100%, regardless of the shake amount of the subject or the subject distance.

The operation will be described hereafter with reference to the flowchart in FIG. 5A.

Figure 2:
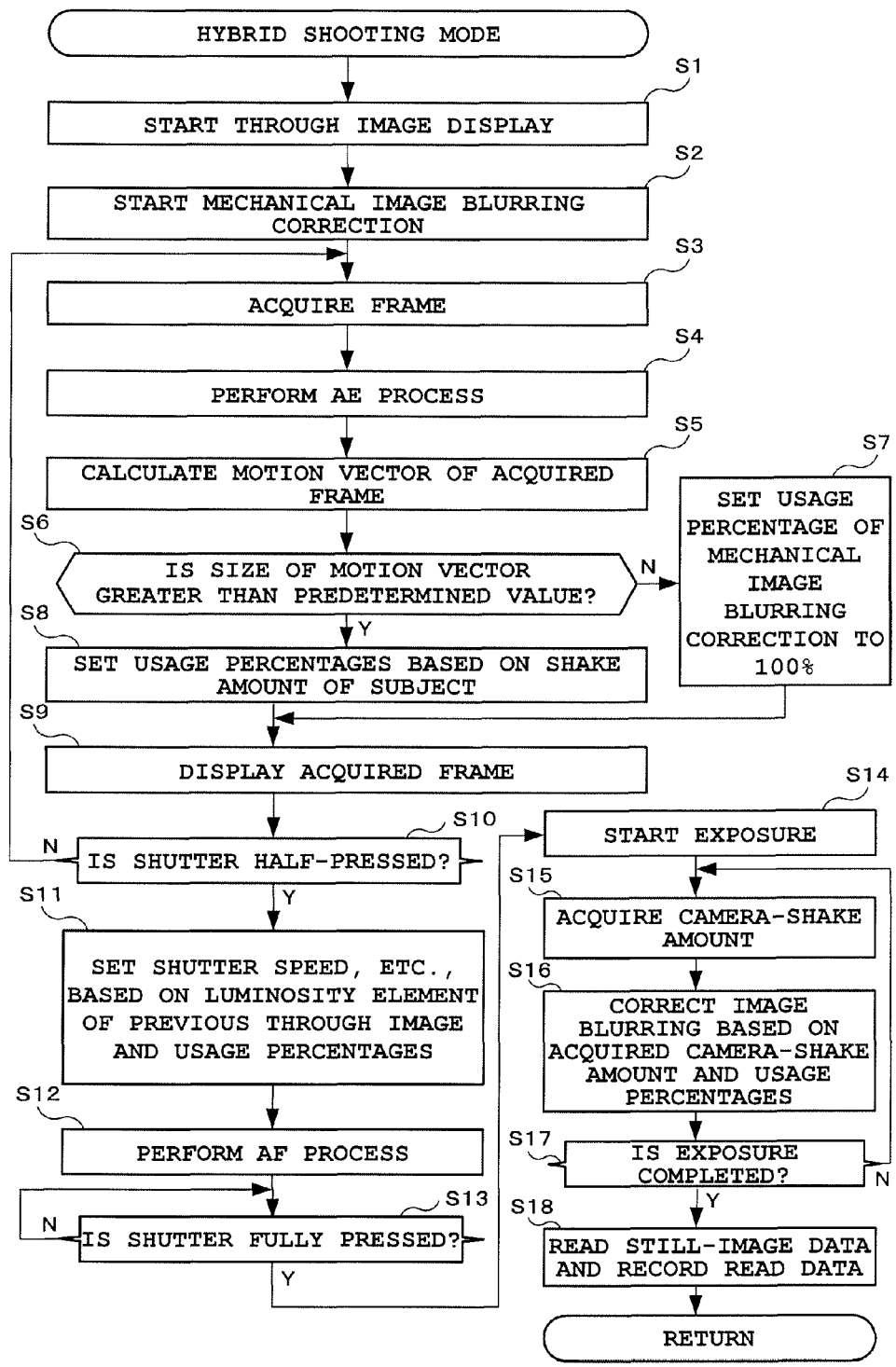
FIG. 2 is a flowchart of operations performed by the digital camera according to a first embodiment.
Figure 4:
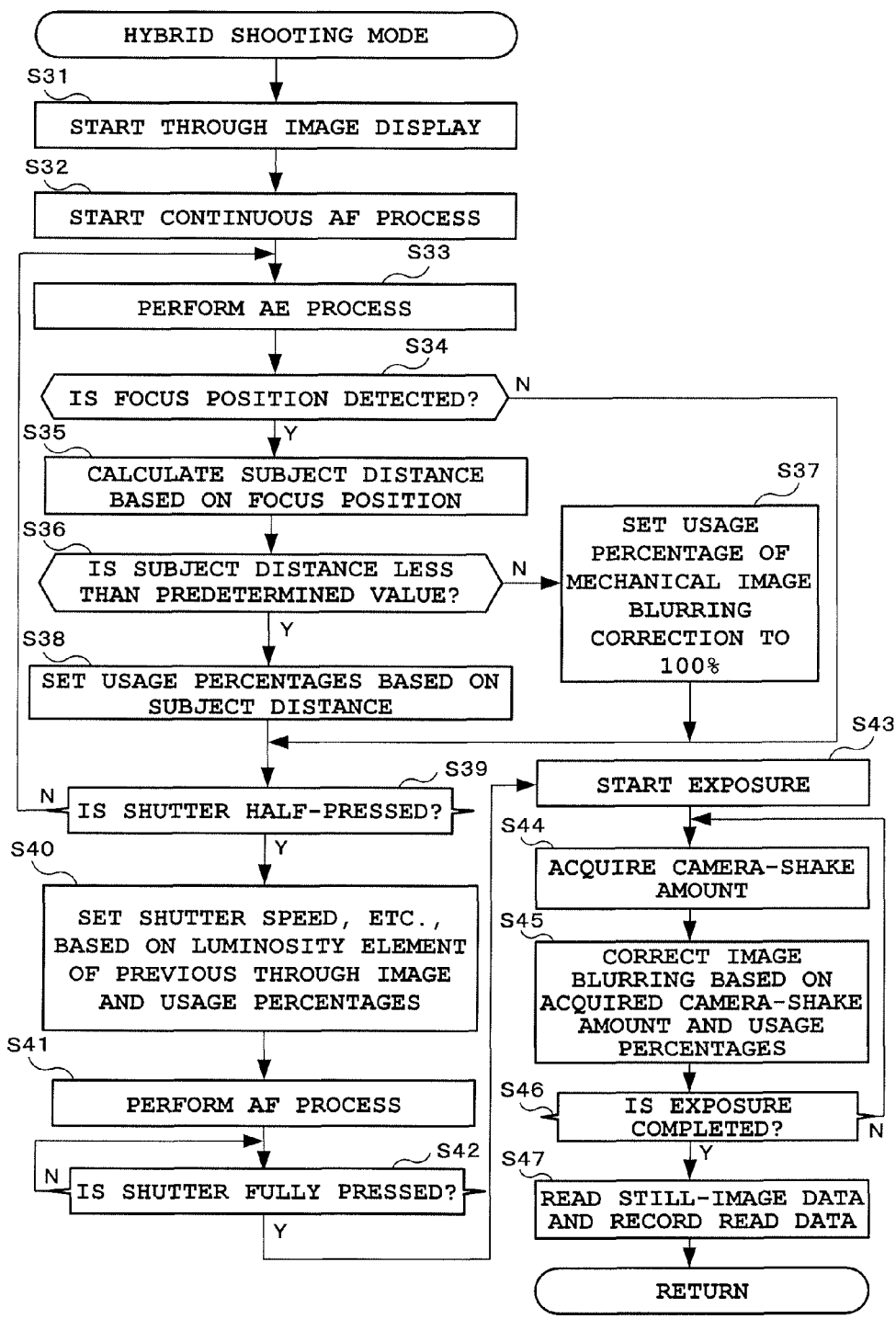
FIG. 4 is a flowchart of operations performed by the digital camera according to a second embodiment.
Figure 5A:
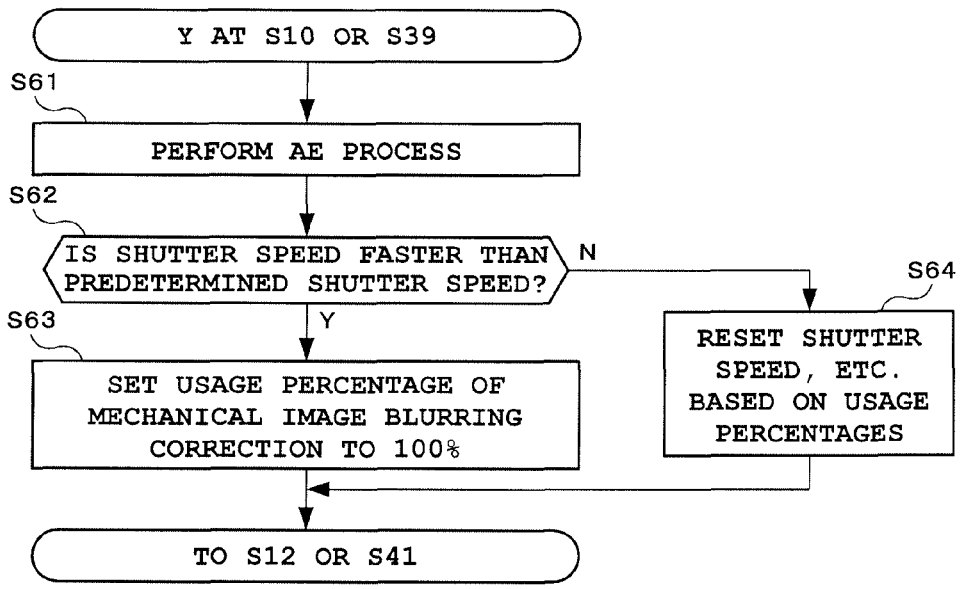
FIG. 5A and FIG. 5B are flowcharts of operations performed by the digital camera in a variation example.

First, when judged at Step S10 in FIG. 2 or at Step S39 in FIG. 4 that the shutter button is half-pressed, the CPU 11 proceeds to Step S61 in FIG. 5A and performs the AE process.

The shutter speed and the like set during the AE process at this time are set based on the normal AE program chart that does not take into consideration the usage percentages for shooting still-images.

Next, the CPU 11 judges whether the shutter speed set during the AE process is faster than a predetermined shutter speed (Step S62). The predetermined shutter speed is recorded in the memory 13.

When judged at Step S62 that the shutter speed is faster than the predetermined shutter speed, the CPU 11 resets the usage percentage of the mechanical image blurring correction to 100% (the usage percentage of the sensitivity image blurring reduction is 0%) (Step S63) and proceeds to Step S12 in FIG. 2 or Step S41 in FIG. 4.

At the same time, when judged at Step S62 that the shutter speed is not faster than the predetermined shutter speed, the CPU 11 resets the shutter speed, the aperture value, and the gain amount set at Step S61, depending on the most recently set usage percentages (Step S64). Then, the CPU 11 proceeds to Step S12 in FIG. 2 or Step S41 in FIG. 4.

In other words, if the sensitivity image blurring reduction is performed when the shutter speed set during the AE process is higher than the predetermined speed (high-speed), the shutter speed is required to be increased further and the shooting sensitivity is required to be sensitized. As a result, the degradation of the image quality becomes noticeable. Therefore, when the optimum shutter speed is higher than the predetermined speed, the usage percentage of the mechanical image blurring correction is set to 100% and the sensitivity image blurring reduction is not performed. As a result, the degradation of the image quality can be suppressed.

According to the variation example (1), an operation such as that shown in FIG. 5A can be performed in place of the operation at Step S11 in FIG. 2 or the operation at Step S40 in FIG. 4.

(2) According to the first and second embodiments, the usage percentages of the mechanical image blurring correction and the sensitivity image blurring reduction are simply set depending on the shake amount of the subject or the subject distance. However, a light value (LV) indicating the luminosity of the subject can be calculated. When the calculated LV is greater than a constant value, the usage percentage of the mechanical image blurring correction can be set to 100%, regardless of the shake amount of the subject or the subject distance.

The operation will be described hereafter with reference to the flowchart in FIG. 5B.

Figure 5B:
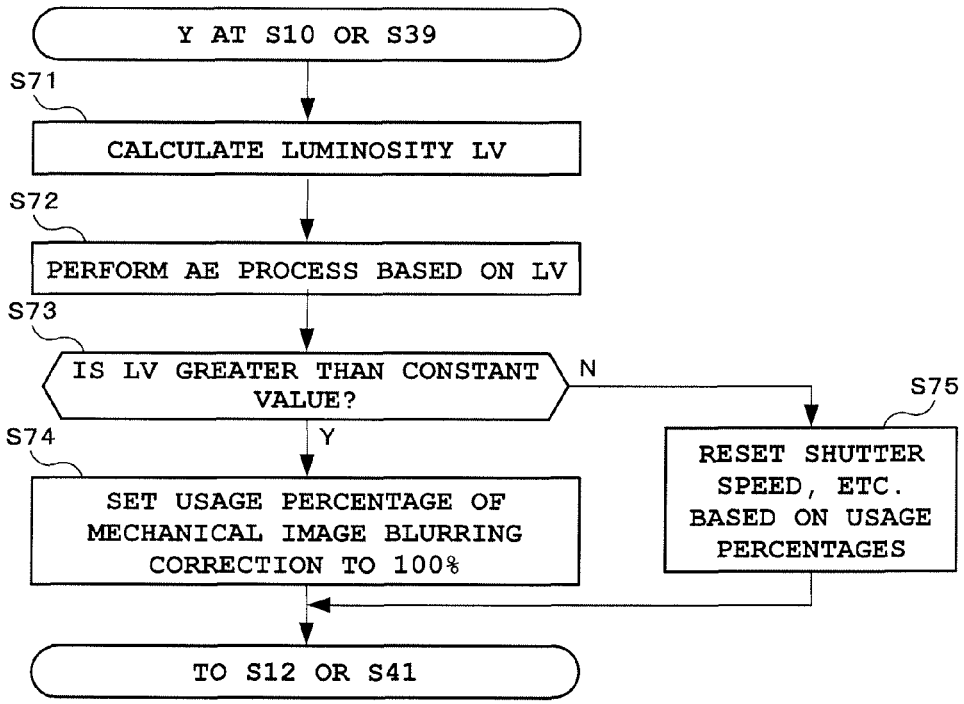

First, when judged at Step S10 in FIG. 2 or at Step S39 in FIG. 4 that the shutter button is half-pressed, the CPU 11 proceeds to Step S71 in FIG. 5B and calculates the LV indicating the luminosity of the subject. The calculation is performed based on the luminosity element in the image data.

Next, the CPU 11 performs the AE process based on the calculated LV (Step S72). The shutter speed and the like set during the AE process are set based on the normal AE program chart.

Then, the CPU 11 judges whether the calculated LV is greater than the constant value (Step S73). The constant value is recorded in the memory 13.

When judged at Step S73 that the calculated LV is greater than the constant value, the CPU 11 resets the usage percentage of the mechanical image blurring correction to 100% (the usage percentage of the sensitivity image blurring reduction is 0%) (Step S74) and proceeds to Step S12 in FIG. 2 or Step S41 in FIG. 4.

At the same time, when judged at Step S73 that the calculated LV is not greater than the constant value, the CPU 11 resets the shutter speed, the aperture value, and the gain amount set at Step S72, depending on the most recently set usage percentages (Step S75). Then, the CPU 11 proceeds to Step S12 in FIG. 2 or Step S41 in FIG. 4.

In other words, when the calculated LV is greater than the constant value, a sufficient amount of light required for shooting is secured. When the sensitivity image blurring correction is performed under such circumstances, the shutter speed is required to be increased further and the shooting sensitivity is required to be sensitized. The degradation of the image quality (for example, blown-out highlights) becomes noticeable. Therefore, when the calculated LV is greater than the constant value, the usage percentage of the mechanical image blurring correction is set to 100% and the sensitivity image blurring reduction is not performed. As a result, the degradation of the image quality can be suppressed.

According to the variation example (2), an operation such as that shown in FIG. 5B can be performed in place of the operation at Step S11 in FIG. 2 or the operation at Step S40 in FIG. 4.

(3) According to the first and second embodiments, the usage percentages of the mechanical image blurring correction and the sensitivity image blurring reduction are set during the through image process display (before the shutter button is half-pressed). However, the usage percentages can be set after the shutter button is half-pressed.

The specific operations will be separated and described according to the first embodiment and the second embodiment.

First, according to the first embodiment, when judged at Step S10 in FIG. 2 that the shutter button is half-pressed, the CPU 11 calculates the motion vector of the most recent through image using the motion vector calculation section 16, based on two through images picked up immediately before the shutter button has been half-pressed. Then, the CPU 11 judges whether the size of the calculated motion vector (the shake amount of the subject) is greater than the predetermined value. When judged that the size of the calculated motion vector is not greater than the predetermined value, the CPU 11 sets the usage percentage of the mechanical image blurring correction to 100%. When judged that the size of the calculated motion vector is greater than the predetermined value, the CPU 11 sets the usage percentages of the mechanical image blurring correction and the sensitivity image blurring reduction, based on the calculated shake amount of the subject and the usage percentages recorded in the memory 13. After the usage percentages are set, the CPU 11 proceeds to Step S11.

In this case, the operations at Step S5 to Step S8 in FIG. 2 are not performed.

Next, according to the second embodiment, when judged at Step S39 in FIG. 2 that the shutter button is half-pressed, the CPU 11 performs the AF process using the contrast detection method. Then, the CPU 11 calculates the subject distance based on the lens position in the focus position and judges whether the calculated subject distance is shorter than the predetermined value (predetermined distance). When judged that the calculated subject distance is not shorter than the predetermined value, the CPU 11 sets the usage percentage of the mechanical image blurring correction to 100%. When judged that the calculated subject distance is shorter than the predetermined value, the CPU 11 sets the usage percentages of the mechanical image blurring correction and the sensitivity image blurring reduction, based on the calculated subject distance and the usage percentages recorded in the memory 13.

After the usage percentages are set, the CPU 11 performs the process at Step S40 and proceeds to Step S42.

In this case, the operations at Step S34 to Step S38 in FIG. 4 are not performed.

Although the usage percentages are set after the shutter button is half-pressed, the usage percentages can be set after the shutter button is fully pressed if the shutter button is fully pressed at once. In this case, the judgment at Step S10 in FIG. 2 and at Step S39 in FIG. 4 of whether the shutter button is half-pressed is replaced with the judgment of whether the shutter button is fully pressed. The operations at Step S13 in FIG. 2 and Step S42 in FIG. 4 are not performed.

(4) The variation example (1) or the variation example (2) can be combined with the variation example (3). In other words, in the variation example (3), an operation such as that shown in FIG. 5A and FIG. 5B can be performed in place of the operation at Step S11 in FIG. 2 or at Step S40 in FIG. 4.

(5) According to the first and second embodiments, the usage percentages of the mechanical image blurring correction and the sensitivity image blurring reduction are automatically set. However, the user can arbitrarily set the usage percentages.

For example, when shooting under a condition with little subject-shake, the user can reduce the usage percentage of the sensitivity image blurring reduction (increase the usage percentage of the mechanical image blurring correction). When image quality is given priority, the user can reduce the usage percentage of the sensitivity image blurring reduction and acquire an image having high image quality (image having little noise). When the subject-shake is significant and subject-shake reduction is given priority over image quality, the user can increase the usage percentage of the sensitivity image blurring reduction (decrease the usage percentage of the mechanical image blurring correction) and acquire an image having no subject-shake.

The operation will be described hereafter with reference to the flowchart in FIG. 6A.

When the user sets the digital camera 1 to hybrid shooting mode by operating the mode switching key in the key input section 12, the CPU 11 starts a so-called through image process display (Step S81). In the through image process display, the CPU 11 starts imaging using the CCD 6 and sequentially displays picked-up through images of the subject in the display section 22.

Next, the CPU 11 judges whether the user has selected menu mode (Step S82). Here, the CPU 11 judges whether an operation signal corresponding with the operation of the menu key is sent from the key input section 12.

When judged at Step S82 that menu mode is selected, the CPU 11 judges whether the user has selected usage percentage setting mode (Step S83).

When the user selects menu mode, the CPU displays a menu in the display section 22, in addition to the through image of the subject. The content of the displayed menu includes shooting sensitivity setting mode, usage percentage setting mode, and the like.

The user can select usage percentage setting mode from within the displayed menu by operating the cross key and the SET key.

When judged at Step S83 that the usage percentage setting mode is not selected, the CPU 11 performs the processing of another selected mode.

At the same time, when judged at Step S83 that the usage percentage setting mode is selected, the CPU 11 sets the usage percentages designated by the user (Step S84) and returns to Step S82.

Figure 6A:
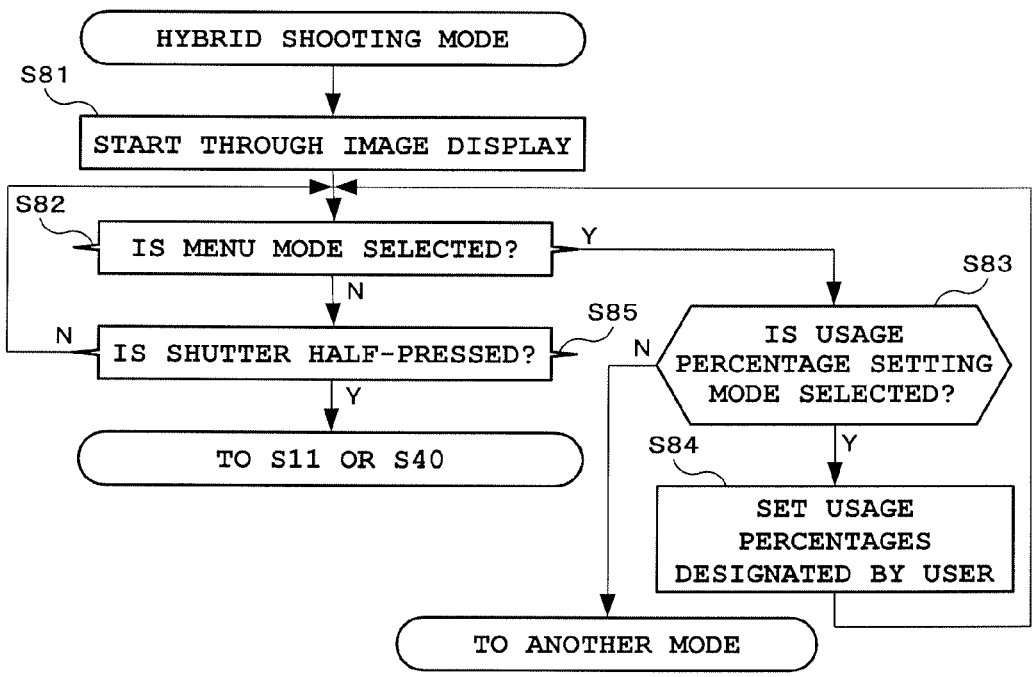
FIG. 6A is a flowchart of operations performed by the digital camera in a variation example.
Figure 6B:
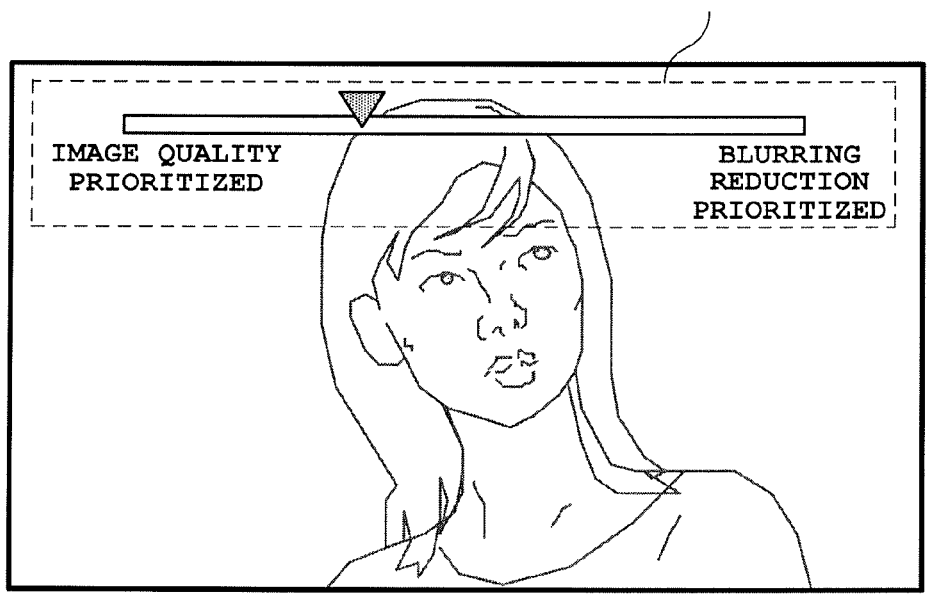
FIG. 6B is a diagram of an image displayed in a display section 22.

When the usage percentage setting mode is selected, the CPU 11 displays a user percentage setting bar, such as that shown in FIG. 6B, in the display section 22, in addition to the through image.

The user can designate the usage percentages by operating the cross key and the SET key while viewing the usage percentage setting bar.

"Image quality prioritized" in the usage percentage setting bar refers to the mechanical image blurring correction. "Blurring reduction prioritized" refers to the sensitivity image blurring reduction. A triangular section in the usage percentage setting bar indicates the current usage percentages. The image quality improves as the triangular section is moved to the left (to "image quality prioritized"). In other words, the usage percentage of the mechanical image blurring correction increases and the usage percentage of the sensitivity image blurring reduction decreases. The image blurring is reduced as the triangular section is moved to the right (to "blurring reduction prioritized"). In other words, the usage percentage of the mechanical image blurring correction decreases and the usage percentage of the sensitivity image blurring reduction increases.

The user operates the cross key to move the triangular section. In other words, the user can adjust the usage percentage by operating the cross key. For example, when the user operates the "←" in the cross key, the triangular section moves to the left. When the user operates the "→" in the cross key, the triangular section moves to the right.

The user adjusts the usage percentages. When the user decides to perform image blurring reduction with the adjusted usage percentages, the user can designate the usage percentages by operating the SET key.

Returning to the flowchart in FIG. 6A, when judged at Step S82 that menu mode is not selected, the CPU 11 judges whether the shutter button is half-pressed (Step S85).

When judged at Step S85 that the shutter button is not half-pressed, the CPU 11 returns to Step S82. When judged that the shutter button is half-pressed, the CPU 11 proceeds to Step S11 in FIG. 2 or Step S40 in FIG. 4.

As a result, the user can select the extent of image quality and blurring reduction.

(6) According to the first and second embodiments, the image blurring reduction of the present invention is applied to when a still-image is shot in still-image shooting mode. However, the image blurring reduction of the present invention can be performed when a through image is being displayed (waiting for shooting and recording) in still-image shooting mode or moving image shooting mode, or when a moving image is being shot in moving image shooting mode.

For example, according to the first embodiment, the usage percentages can be set based on the motion vector acquired from the current imaged frame. The mechanical image blurring correction and the sensitivity image blurring reduction based on the set usage percentages can be performed on the next imaged frame. This operation can be performed repeatedly.

According to the second embodiment, the usage percentages can be set every time the subject distance is calculated. The mechanical image blurring correction and the sensitivity image blurring reduction based on the set usage percentages can be performed on the imaged frames until the next subject distance is calculated (the subject distance changes).

(7) According to the first and second embodiments, the usage percentages of the mechanical image blurring correction and the sensitivity image blurring reduction are set depending on the shake amount of the subject (the motion vector size acquired from the image) or the subject distance. However, the mechanical image blurring correction according to the shake amount detected by the camera-shake detection section 17 can be performed without limitations, regardless of the detected shake amount of the subject and the subject distance (the correction lens 3 is driven within the drivable range using the shake amount detected by the camera-shake detection section 17). Only the extent (intensity) of the sensitivity image blurring reduction is changed depending on the detected shake amount of the subject and the subject distance. In other words, the intensity of the sensitivity image blurring reduction can be increased as the detected shake amount of the subject increases (the subject distance becomes closer). As according to the first and second embodiments, unnecessary sensitivity image blurring reduction is not performed and the image quality is not needlessly degraded in this case, as well.

In addition, the mechanical image blurring correction can be performed without limitations, regardless of the detected shake amount of the subject and the subject distance. Only whether the intensity of the sensitivity image blurring reduction is 100% (ON) or 0% (OFF) is decided, depending on the shake amount of the subject and the subject distance. When the sensitivity image blurring reduction is turned ON, the mechanical image blurring correction and the sensitivity image blurring reduction are both performed without limitations. When the sensitivity image blurring reduction is turned OFF, the image blurring reduction is performed only by the mechanical image blurring correction.

This method is particularly effective when the image blurring caused by camera-shake cannot be completely corrected even by the mechanical image blurring correction.

(8) According to the first embodiment, the mechanical image blurring correction is performed during through image process display, and the shake amount (motion vector) of the subject is calculated based on the imaged frame. However, the subject-shake can be calculated as follows, without performing the mechanical image blurring correction during the through image process display. The entire picked-up frame image can be divided into a plurality of areas and the motion vectors of the respective areas can be calculated. When the size or direction of the motion vector in an area differs, the area is judged to have subject-shake. The subject-shake can be calculated based on the differing size and direction of the motion vector.

In addition, the subject-shake can be calculated as follows, without performing the mechanical image blurring correction during the through image process display. The subject-shake can be calculated by the detected shake amount being subtracted from the calculated motion vector (in this case, the motion vector includes camera-shake and subject-shake).

(9) According to the first embodiment, the usage percentages are set based on the subject-shake amount. However, the usage percentages can be set depending on a value based on the contrast element of the image.

The contrast element becomes higher in images having no image blurring. The more image blurring there is, the lower the contrast element of the image. The mechanical image blurring correction is performed during the through image process display. Therefore, the subject shake becomes larger as the contrast element decreases.

As a result, when the contrast element of the image of the imaged frame is detected and the value based on the detected contrast element (for example, mean value) is higher than a predetermined value, the usage percentage of the mechanical image blurring correction is set to 100%. When the value based on the detected contrast element is lower than the predetermined value, the usage percentage is set depending on the contrast element.

FIG. 7A and FIG. 7B show the usage percentages corresponding to the detected contrast elements.

As shown in FIG. 7A, when the contrast element is high, the usage percentage of the mechanical image blurring correction is set to a high percentage. As shown in FIG. 7B, when the contrast element is low, the usage percentage of the sensitivity image blurring reduction is set to a high percentage.

(10) According to the second embodiment, the subject distance is acquired based on the focus position detected by the contrast detection method. However, the subject distance can be acquired by a range sensor that measures the distance to the subject being provided.

(11) The variation example can be any combination of the variation examples (1) to (10).

(12) According to each embodiment, the present invention is applied to the digital camera 1. However, the present invention can be applied to a cell phone with a camera feature, a personal digital assistant (PDA) with a camera feature, a personal computer with a camera feature, an integrated circuit (IC) recorder with a camera feature, a digital video camera, or the like. In other words, the present invention can be applied to any device as long as it can image a subject.

Furthermore, although the computer program product of the imaging device which is a preferred embodiment of the present invention is stored in the memory (for example, ROM, etc.) of the imaging device, this processing program is stored on a computer-readable medium and should also be protected in the case of manufacturing, selling, etc. of only the program. In that case, the method of protecting the program with a patent will be realized by the form of the computer-readable medium on which the computer program product is stored.

While the present invention has been described with reference to the preferred embodiments, it is intended that the invention be not limited by any of the details of the description therein but includes all the embodiments which fall within the scope of the appended claims.

What is claimed is:

1. An imaging device comprising:
an image pickup section which images a subject;
an image blurring correction section which performs a first process to correct image blurring that is caused due to camera-shake, the first process comprising moving an optical axis direction of the imaging device;
an image blurring reduction section which performs a second process after the first process to reduce image blurring that is caused by subject blurring, the second process being different from the first process;
a detection section which detects the image blurring based on image data picked up by the image pickup section to which camera-shake caused image blurring correction has been performed by the image blurring correction section; and
a control section which controls whether or not to perform the second process that reduces the image blurring by the image blurring reduction section, based on the image blurring detected by the detection section.

2. The imaging device according to claim 1, further comprising:
a camera-shake detection section which detects the camera-shake;
wherein the image blurring correction section corrects the image blurring caused by the camera-shake, based on the camera-shake detected by the camera-shake detection section.

3. The imaging device according to claim 2, wherein the camera-shake detection section detects the camera-shake using a gyro-sensor.

4. The imaging device according to claim 1, further comprising:
a judgement section which judges whether or not an intensity of the image blurring detected by the detection section is less than a predetermined value;
wherein the control section prohibits performance of the second process that reduces the image blurring by the image blurring reduction section when the judgement section judges that the intensity of the image blurring is less than the predetermined value.

5. The imaging device according to claim 1, wherein the detection section detects the image blurring by calculating a motion vector of the image data, based on the image data to which the image blurring correction has been performed by the image blurring correction section.

6. The imaging device according to claim 1, wherein the detection section detects the image blurring by detecting a contrast element of the image data to which the image blurring correction has been performed by the image blurring correction section.

7. The imaging device according to claim 1, wherein the control section controls an intensity of the image blurring reduction performed by the image blurring reduction section based on the image blurring detected by the detection section, and makes the image blurring correction section perform the image blurring correction.

8. The imaging device according to claim 1, wherein the image blurring reduction section reduces the image blurring by making a shutter speed faster when shooting by the image pickup section.

9. The imaging device according to claim 8, wherein the control section controls luminosity of the image data based on the image blurring detected by the detection section.

10. The imaging device according to claim 9, wherein the control section controls the luminosity of the image data by controlling a number of added pixels in the image data.

11. The imaging device according to claim 9, wherein the control section controls the luminosity of the image data by controlling an amplification factor of the image data.

12. The imaging device according to claim 1, wherein the image pickup section includes an image blurring detection lens, and the image blurring correction section corrects the image blurring by moving and controlling the image blurring detection lens in a direction perpendicular to the optical axis direction.

13. The imaging device according to claim 1, wherein the image pickup section includes an imaging element, and the image blurring correction section corrects the image blurring by moving and controlling the imaging element in a direction perpendicular to the optical axis direction.

14. The imaging device according to claim 1, further comprising:
a still-image shooting section that shoots a still-image of the subject using the image pickup section;
wherein when the still-image is shot by the still-image shooting section, the control section controls an intensity of image blurring reduction performed by the image blurring reduction performed by the image blurring reduction section based on the image blurring detected by the detection section.

15. The imaging device according to claim 1, further comprising:
- a light amount calculation section which calculates a light amount based on light on the subject; and
- a light amount judgement section which judges whether or not the light amount calculated by the light amount calculation section is a sufficient light amount required for shooting;
- wherein when the light amount judgement section judges that the calculated light amount is not sufficient, the control section prohibits performance of image blurring reduction by the image blurring reduction section and controls the image blurring correction section to perform the image blurring correction.

16. The imaging device according to claim 1, further comprising:
- a shutter speed calculation section which calculates an optimum exposure, and a shutter speed based on the calculated optimum exposure; and
- a shutter speed judgement section which judges whether or not the shutter speed calculated by the shutter speed calculation section is faster than a predetermined shutter speed;
- wherein when the shutter speed judgement section judges that the calculated shutter speed is faster than the predetermined shutter speed, the control section prohibits performance of image blurring reduction by the image blurring reduction section and controls the image blurring correction section to perform the image blurring correction.

17. An imaging device comprising:
- an image pickup section which images a subject and outputs image data;
- an image blurring correction section which performs a first process to correct image blurring that is caused due to camera-shake, the first process comprising moving an optical axis direction of the imaging device;
- an image blurring reduction section which reduces image blurring by a second process after performing the image blurring correction by the first process, wherein the first and second processes are different from each other;
- a detection section which detects a subject distance; and
- a control section which controls an intensity of image blurring reduction performed by the image blurring reduction section based on the subject distance detected by the detection section.

18. The imaging device according to claim 17, wherein the control section performs control to decrease the intensity of blurring reduction performed by the image blurring reduction section, as the subject distance detected by the detection section increases.

19. The imaging device according to claim 17, wherein the control section performs control to increase the intensity of image blurring correction performed by the image blurring correction section, as the subject distance detected by the detection section increases.

20. The imaging device according to claim 17, further comprising:
- a judgement section which judges whether or not a subject distance detected by the detection section is longer than a predetermined distance;
- wherein the control section prohibits the performance of image blurring reduction by the image blurring reduction section when the judgement section judges that the subject distance is longer than the predetermined distance.

21. The imaging device according to claim 17, wherein the control section controls the image blurring correction section to perform the image blurring correction.

22. An image blurring reduction method for an imaging device including an image pickup section that images a subject, an image blurring correction section that performs a first process to correct image blurring caused due to camera-shake, the first process comprising moving an optical axis direction of the imaging device, and an image blurring reduction section that performs a second process after the first process to reduce image blurring caused by subject blurring, the second process being different from the first process, and the image blurring reduction method comprising:
- detecting the image blurring based on image data to which camera-shake caused image blurring correction has been performed by the image blurring correction section; and
- controlling whether or not to perform the second process that reduces the image blurring by the image blurring reduction section, based on the image blurring detected by the detection section.

23. A non-transitory computer-readable recording medium having stored thereon a computer readable program for an imaging device including an image pickup section that images a subject, an image blurring correction section that performs a first process to correct image blurring caused by camera-shake, the first process comprising moving an optical axis direction of the imaging device, and an image blurring reduction section that performs a second process after the first process to reduce image blurring caused by subject blurring, the second process being different from the first process, and the computer readable program being executable by a computer of the imaging device to perform functions comprising:
- detecting the image blurring based on image data to which camera-shake caused image blurring correction has been performed by the image blurring correction section; and
- controlling whether or not to perform the second process that reduces the image blurring by the image blurring reduction section, based on the image blurring detected by the detection section.

* * * * *

UNITED STATES PATENT AND TRADEMARK OFFICE
CERTIFICATE OF CORRECTION

| | |
|---|---|
| PATENT NO. | : 8,290,356 B2 |
| APPLICATION NO. | : 12/968220 |
| DATED | : October 16, 2012 |
| INVENTOR(S) | : Keiichi Imamura |

It is certified that error appears in the above-identified patent and that said Letters Patent is hereby corrected as shown below:

Column 20, Line 65-66; Claim 14,
    After "reduction" in line 8, delete "performed by the image blurring reduction".

Signed and Sealed this
Nineteenth Day of February, 2013

Teresa Stanek Rea
*Acting Director of the United States Patent and Trademark Office*